United States Patent Office 3,511,572
Patented May 12, 1970

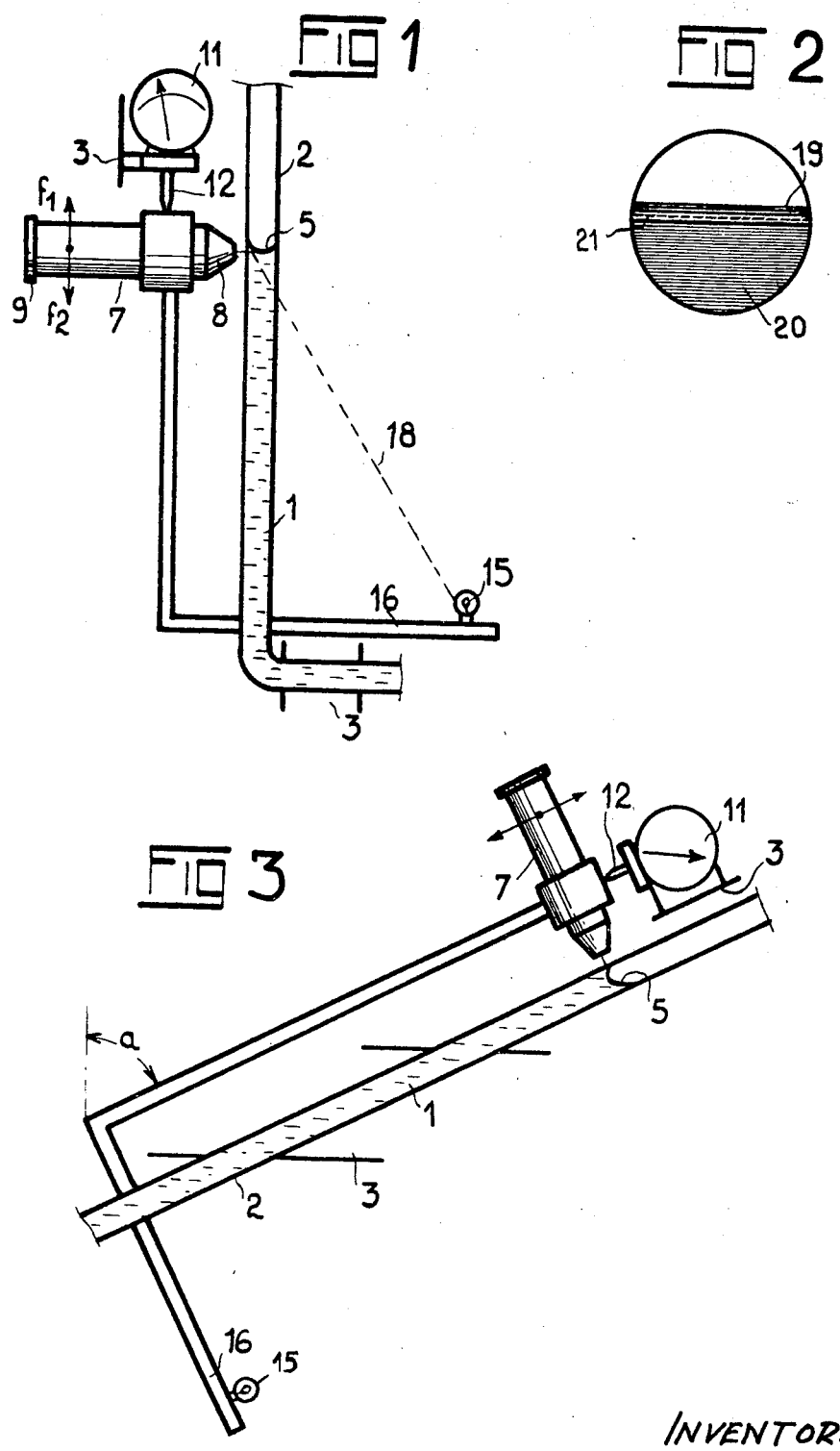

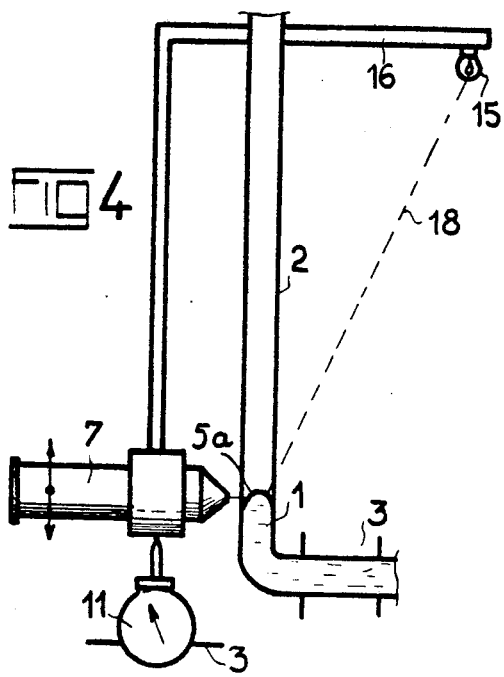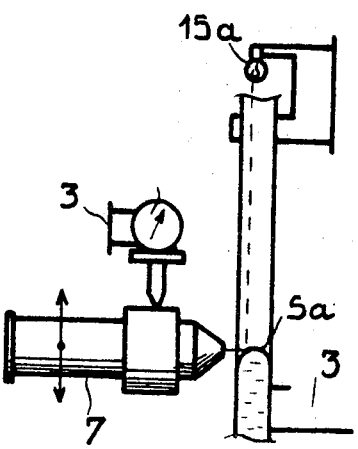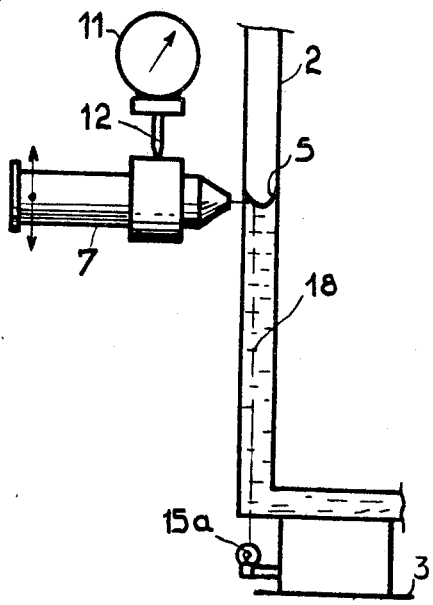

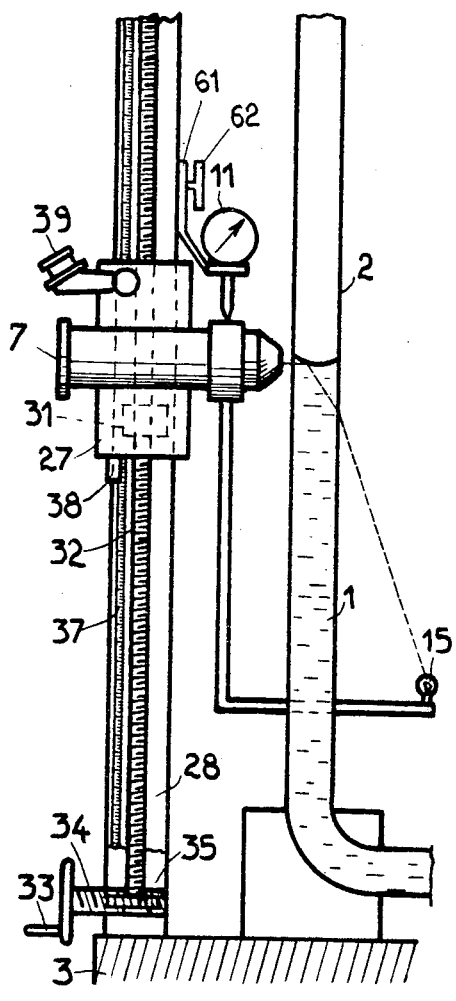
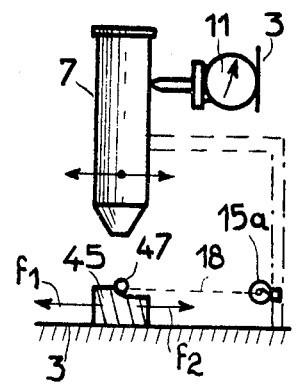
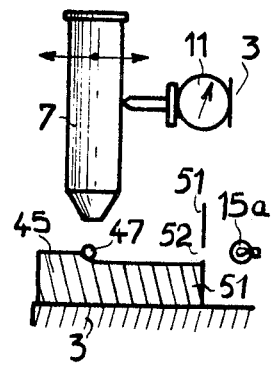

3,511,572
OPTICAL METHOD AND DEVICES FOR MEASURING POSITIONS, ESPECIALLY LIQUID LEVELS
Jean L. Peube, 6 Villa Desire Filleaud, and André Fortier, 12 Avenue Leon Cambillard, both of Clamart, Seine, France
Filed Oct. 13, 1965, Ser. No. 495,663
Claims priority, application France, Oct. 29, 1964, 993,123
Int. Cl. G01b 9/02; G01f 23/02
U.S. Cl. 356—106                                              4 Claims

ABSTRACT OF THE DISCLOSURE

Accurate measurement of the position of a body, or a liquid column is obtained by directing light at a curved portion of the body (or a curved body associated therewith), and in case of liquids, against the curved meniscus formed by the liquid with the side wall of the container so that reflected light will envelope a caustic, and form interference fringes; the interference fringes are then observed under magnification as an indication of the position of the object.

---

This invention relates to the precision measurement of positions by optical means, and its main but not exclusive application lies in the field of liquid level measurement.

The accurate obsolute measurement of liquid levels has considerable importance in many circumstances, as for example in the measurement of pressure by means of liquid-column pressure gauges. A limit to the accuracy attainable with conventional pressure gauging instrumentation is set by the accuracy with which the reading of the level of the liquid column in the U-tube or similar device can be made. It is an object of this invention to provide a method and means for performing such readings to within a degree of accuracy one or more orders of magnitude greater than was heretofore possible, and consequently to construct pressure gauges—and analogous instruments—of far higher sensitivity than currently available, and of broad range. A broader object is the provision of means for accurately determining the position of a movable object without exerting thereon any disturbing force liable to cloud the measurement, as would be the case were the object to be engaged by the finger of a mechanical comparator.

Optical devices have already been proposed for the precise measurement of displacements, including the measurement of liquid levels, and such earlier devices have included interferometers. In an interferometric device, means are provided for creating interference fringes between two partial light beams, one of which is usually reflected from the displaceable object, and fringe displacement is measured as an accurate indication of the object displacement. While the accuracy of such devices is high, the means required to produce the fringes are complicated and delicate, increasing the cost and diminishing the reliability of the instruments. The fringe-creating mechanism is space-consuming, and in many cases the necessary space is not available. Moreover, the accuracy of such prior devices has often been limited by minute fluctuations in the level of the liquid (especially in the case of low-viscosity liquids), and elaborate precautions have had to be taken in order to prevent the readings being disturbed by vibrations normally present in any industrial or laboratory set-up. Also, in any interferometric measuring method, the result of the measurement is a function of the wavelength of the light used, thus generally requiring the employment of accurately calibrated monochromatic light beams. Objects of this invention include the provision of optical means of measurement of liquid levels and object displacements, which are considerably simpler and more compact than conventional interferometer-type devices in that they do not require any special means for creating interference fringes; are, in preferred embodiments of the invention, virtually insensitive to vibrations and fluctuations in liquid level; and in which the measurement is independent of wavelength, and which can be operated with ordinary non-monochromatic light sources. Other objects and advantages will appear.

The invention is based on the practical exploitation of a little known optical phenomenon involved in the reflection of light rays from sharply curved reflective surfaces, such as the surface of a meniscus of the kind formed by surface tension at the junction of a liquid surface and the wall surface of a container such as a tube in which the liquid is contained. It is found that adjacent reflected rays from such a surface interfere with one another to form sets of well-defined interference fringes, and that suitably selected ones of these fringes can, through the use of appropriate apparatus, serve as extremely sensitive markers for indicating the position of the reflective surface, such as the level of the afore-mentioned liquid.

The invention will now be described in detail with reference to the accompanying drawings, wherein:

FIG. 1 is a simplified elevational view of a liquid level gauge instrument according to the invention;

FIG. 2 is a magnified view of a typical set of interference fringes as observed through the viewer of the instrument;

FIG. 3 is a view similar to FIG. 1 wherein the gauge tube is inclined to the vertical;

FIG. 4 is a partial view illustrating the general arrangement of a level gauging instrument according to the invention wherein the liquid in the tube forms a convex meniscus;

FIG. 5 is a schematic elevational view of a liquid level gauge according to the invention using a stationary light source, in the case of a concave meniscus;

FIG. 6 similarly shows an embodiment using a stationary light source in the case of a convex meniscus;

FIG. 7 is an elevational view of an embodiment generally similar to that shown in FIG. 1, wherein the precision displacement mechanism is illustrated in somewhat greater detail;

FIG. 8 illustrates in schematic elevation an embodiment of the invention as applied to the gauging of the position of a solid object.

Figure 12:
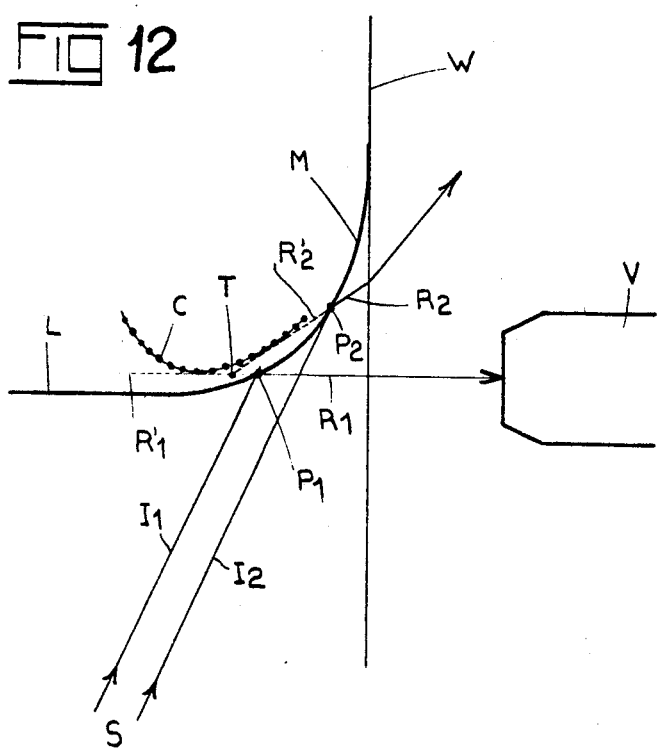
Figure 13:
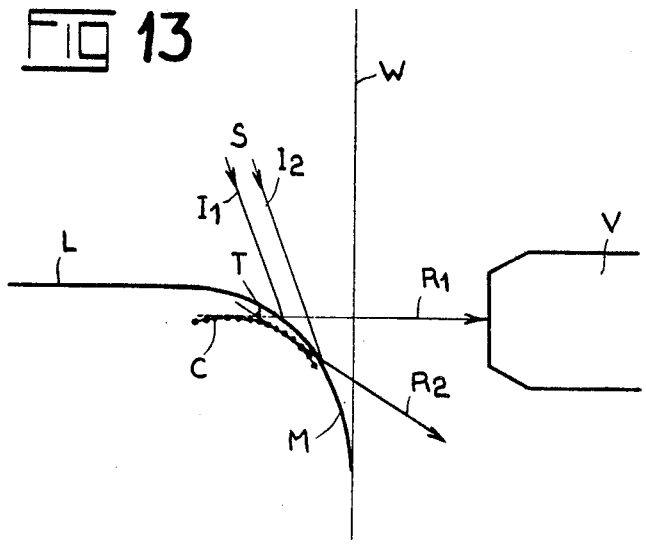
Figure 14:
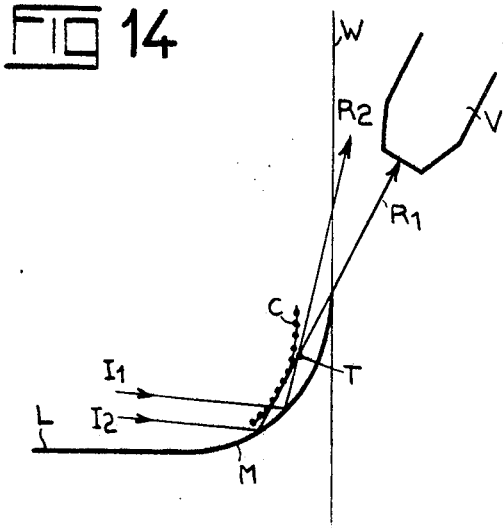
Figure 15:
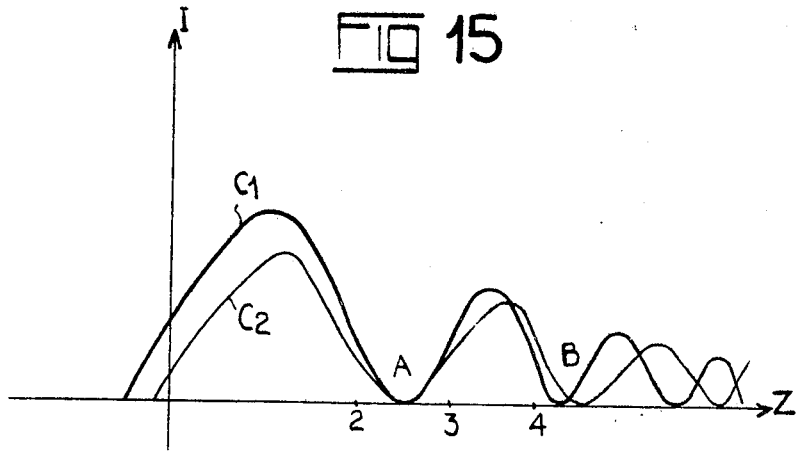

FIG. 9 is a similar view of a modified embodiment of apparatus for gauging the position of a solid object;

FIGS. 10 and 11 are partial, large-scale views illustrating how suitable surface portions of a solid object whose position is to be gauged, may be used as the reflective surfaces in apparatus according to the invention;

FIGS. 12, 13 and 14 are geometric-optical diagrams explaining the principles on which the invention is based, respectively for the cases of a concave meniscus illuminated from below, a convex meniscus illuminated from above and a concave meniscus illuminated from above; and FIG. 15 is a graph showing light distribution as a function of distance for two different wavelengths in the case of a set of caustic-interference fringes of the kind used according to the invention.

Diagrammatically illustrated in FIG. 12 is one transparent vertical sidewall W of a container, such as a wall of a glass tube, containing a body of liquid whose free surface is shown at L. It is here noted that the wall W is shown as a single rather than a double line for clarity in the representation of the emerging light rays because the thickness of the wall can be disregarded for the purposes of the theory being described, such thickness merely resulting in a parallel shift of the emerging rays which is immaterial as far as the present theory is concerned.

Near the junction between the free level L of the liquid and the inner surface of wall W, said level curves to form a so-called meniscus M. In the diagram, the liquid level L is shown as rising towards the wall surface W, i.e. the meniscus M is upwardly concave, this being the case whenever the liquid L wets the wall surface W, as for example where the liquid is water and the wall is clean glass. Should the liquid not wet the wall surface, as would be the case with mercury for example, the level L would drop rather than rise towards the wall surface (see FIG. 13) and the meniscus M would be upwardly convex rather than concave as here shown. The basic theory would still be the same and the invention is equally applicable to such instances, as will be shown later.

At $I_1$ and $I_2$ are shown two adjacent light rays forming part of a parallel pencil of light issuing from a narrow light source, not shown. The source may be positioned beyond the opposite sidewall of the tube or container remote from the sidewall W, and a suitable vertical distance described in detail. The incident rays $I_1$ and $I_2$ strike the curved meniscus surface M from below, and are wholly or partially reflected therefrom as the reflected rays $R_1$ and $R_2$ respectively. If the meniscus M is assumed to be a part-spherical surface (the assumption while not strictly true is permissible for reasons to be presently explained) then the reflected rays such as $R_1$ and $R_2$, extended as at $R'_1$ and $R'_2$ beyond the surface of the meniscus M, are all tangent to a common envelope surface C known in optics as the caustic.

It is found, and on this finding the invention is based that in a certain area close to the caustic C projections of the reflected rays intersect as at T to generate a system of virtual interference fringes, and that these fringes can be observed by means of a suitable optical viewer V positioned as shown on the outer side of the container wall W. Any displacement of a selected one of these fringes will then provide an extremely sensitive indication of a change in the liquid level L within the container.

FIG. 2 shows a typical pattern of fringes observable in this manner. As shown, such a pattern includes a dark shadow area 20 with a system of alternately light and dark fringes lying to one side of it, the fringes being substantially straight lines. A main initial one of these fringes, designated 19, is especially convenient to use as the level marker according to the invention, as by placing it in coincidence wth a reticle wire 21 of the viewing device V.

It will be evident that the above theory holds both in the case that the wall surface W is a planar surface normal to the plane of the drawing, in which case the meniscus surface M and the caustic C are cylindrical surfaces, and also holds where the wall surface W is a cylindrical surface having its axis positioned in the plane of the drawing, in which event the meniscus M and caustic C would be surfaces of revolution about said axis. In the first case, the interference fringes would be a family of straight lines all parallel to the wall W while in the second case the fringes would be concentric annuli coaxial with the wall surface W, but they would still be viewable as substantially straight segments through the viewer V.

As earlier stated, the contour of meniscus M is not truly an arc of a circle; that is, the meniscus surface is not truly part-spherical in the case the wall surface W is cylindrical. It is shown analytically that the contour of meniscus M is a catenary arc. This consideration modifies the above-given simplified theory insofar as that instead of there being a single set of interference fringes (as described above) there actually exist a plurality of such sets of fringes each corresponding to a particular circular arc closely following a segment of the true catenary contour of the meniscus. This does not, however, introduce difficulty since any essential change in the principles disclosed, and in practice any convenient one of the sets of fringes can be selected for viewing to achieve the purposes of the invention.

In the above it was assumed that the liquid whose level is to be indicated was of such a nature as to wet the container wall surfaces thereby providing an upwardly concave meniscus. FIG. 13 will show that the invention is equally applicable to the case of a non-wetting liquid, e.g. mercury, in which the meniscus is upwardly convex. In this figure geometric components corresponding to those in FIG. 12 are indicated by the same references. It will be evident that the only difference is in the position at which the source S must be located, namely above the liquid surface instead of being below.

Furthermore, it will be noted that with the geometry shown in FIG. 12, the system requires the liquid to be transparent since the incident rays from source S must shine through the liquid. This however does not impose a limitation on the invention, and FIG. 14 shows that the method is applicable to the cases of opaque liquids which wet the container surfaces. In this case it will be observed that the caustic C is obtained as the envelope of the rays reflected off the meniscus and consequently the interference fringes are formed as in the preceding instances.

Practical embodiments of the invention will now be described.

In FIG. 1 is shown a vertical tube 2 containing a body of transparent liquid 1 which is wetting the wall surfaces of the tube so as to provide an upwardly concave meniscus 5. The tube 1 may, for example, form part of a high-precision pressure gauge, or analogous instrument, and is fixedly supported from suitable stable frame structure partly indicated at 3. A level gauging device according to the present invention comprises a rigid frame generally indicated at 16, suitably mounted for accurate vertical displacement relative to the fixed tube frame 3 through means not here shown, but one exemplary construction of which will be later described.

The rigid displaceable frame 16 is shown as including a horizontally jutting arm on which is supported a light source 15 and an upstanding vertical arm supporting a viewer 7. It will be recognized that the over-all geometry is similar to that shown in FIG. 12, in that a pencil of light rays 18 emitted by source 15 enters a wall of tube 2 and traverses part of the transparent liquid therein to strike the under surface of the curved portion of the meniscus 5, at a relatively large angle to the normal to said surface. The rays are partly or wholly reflected from the interface of the meniscus and are received in the objective lens 8 of the viewer 7, which further includes the eyepiece 9. Means are provided for accurately measuring the vertical displacements of the movable frame 16, and such means may include a conventional comparator 11 supported from the fixed frame structure 3 and having a plunger 12 engaging the casing of viewer 7 as shown.

In the operation of the device, the rigid frame 16 is displaced by suitable micrometer means, not shown, until the main fringe 19 (FIG. 2) of the system of interference fringes visible through viewer 7 coincides with the reticle wire 21 of the viewer, and the comparator 11 is then preferably adjusted relative to fixed frame 3 until the comparator dial reads zero. Thereafter, should the liquid level in tube 2 vary, e.g. as a result of a variation in the pressure being measured by means of the pressure gauge of which the tube forms part, the frame 16 is readjusted until the reticle wire 21 of the viewer again coincides with the main interference fringe 19. The corresponding indication read on the comparator dial 11 is then a measure of the change in liquid level, or change in the pressure sensed.

Pressure gauges constructed in accordance with FIG. 1 have been used to measure pressures over a range as wide as from 300 torr to $10^{-2}$ torr with an absolute accuracy of at least $4 \times 10^{-4}$ torr, a result unparalleled by any currently available instrument the applicants are aware of.

As shown by FIG. 3, the instrument just described with reference to FIG. 1 can be so set up that the tube 2 is at any desired angle α to the vertical, the frame 16 being made displaceable parallel to the direction of the tube. This provides a means of further increasing, when desired, the sensitivity of the instrument, the increase in sensitivity achieved being proportional to angle α.

FIG. 4 relates to a liquid level measuring device generally similar to that of FIG. 1, in which however the liquid is one that does not wet the surfaces of the tube, e.g. mercury. The meniscus 5a is accordingly convex. The geometry in this case is similar to that described with reference to FIG. 13. That is, the light source 15 in this case is supported from the displaceable frame 16 so as to be positioned above the liquid level in the tube, and the beam 18 therefrom is reflected from the convex upper side of the meniscus 5a into the laterally positioned viewer 7. The comparator 11 is shown supported below the viewer.

In the arrangements so far described with reference to FIGS. 1, 3 and 4, the light source 15 and viewer 7 are rigidly interconnected by means of the frame 16 and are bodily displaceable together when the viewer 7 is displaced in order to recenter the selected interference fringe relative to the reticle of the viewer. Such an arrangement is especially convenient since it will ensure in a simple and effective way a substantially constant angular relationship of the incident and reflected light rays with respect to the meniscus surface, and thereby ensure that the same set of interference fringes is being observed before and after the variation in liquid level and the subsequent displacement of the viewer.

A similar result can in some cases be obtained, however, using a stationary light source rather than a source displaceable bodily with the viewer. This is demonstrated in FIGS. 5 and 6 which respectively relate to a concave and a convex meniscus, i.e. a wetting and non-wetting liquid. In FIG. 5, the light source 15a is shown fixedly supported from the stationary frame 3 at a position below the bottom of the tube 2 so that the pencil of incident light rays 18 is parallel to the direction of liquid level variation and parallel to the direction of displacement of viewer 7, i.e. vertical as here shown. The precise positions of light source 15a and viewer 7 are so adjusted that the rays are reflected from the meniscus interface at a constant angle into the viewer 7. It may here be noted that while the viewer 7 is shown as having its optical axis horizontal in all of the exemplary embodiments shown, this is not by any means essential for the purposes of the invention.

FIG. 6 presents an arrangement quite analogous to that of FIG. 5 except that the light source 15a is fixedly supported above the top of the tube rather than below the bottom of the tube, as is required in the case of a convex meniscus as earlier discussed.

FIG. 7 illustrates with somewhat greater detail one suitable form of mechanism for displacing the viewer 7 parallel to the direction of tube 2. The over-all geometry of this example is the same as that shown in FIG. 1. It will be seen that the viewer 7, to the casing of which the rigid frame 16 supporting the source 15 is attached, is secured to a sliding carriage 27. This carriage is slidable on ways formed on a vertical column 28 upstanding from the base frame 3. The cooperating bearing surfaces of carriage 27 and column 28 are in precision mating relationship so that any clearance and backlash between them is reduced to an order of magnitude less than the inherent precision achieved by the optical measuring means of the invention, for example substantially less than one micron. Any suitable precautions, well known in precision mechanism engineering, may be employed for this purpose, including inter alia rows of spring-pressed antifriction rollers (not shown) mounted in the carriage 27 and engaging the ways on column 28. A vertical lead screw 32 is journalled in suitable bearings, not shown, of column 28 so as to be rotatable but not vertically displaceable with respect to it. The screw 32 engages a correspondingly threaded nut 31 secured to carriage 27, the screw and nut preferably having trapezoidal threads. A handwheel 33 is journalled on a shaft at the base of column 28 and is drivingly connected with lead screw 32 by way of a worm and wormgear connection 34–35 or equivalent means. Comparator 11 is supported from column 28 by way of any suitable connection provided with vertical adjusting means, as schematically indicated by a bracket 61 and wing-screw 62 engaging a vertical slot, not shown, in the side of column 28, with the comparator feeler being engageable with the top of the casing of the viewer as shown. For indicating the vertical position of the carriage 27 along the column 28, there is provided a calibrated scale 37 fixed to and extending along a side of the column, and cooperating with a vernier scale 38 attached to the carriage 27. An optical viewer 39 is mounted on the carriage 27 and cooperates with the calibrated scales 37–38 to provide a precise indication of the vertical position of the main viewer 7. The broad-range position indicating arrangement 37–39 may be used to provide a preliminary indication of the liquid level, and the comparator 11 may then be adjusted in position by means of screw 62 so that its feeler engages the casing of viewer 7. Subsequent small variations in the liquid level can then be quickly and accurately gauged by reading the comparator dial. Alternatively, either one of the two indicator means 11 or 37–39 may be omitted if desired.

Before discussing in detail certain important characteristics of the invention, additional uses to which the invention can be put in fields other than liquid level measurement will be described with reference to FIGS. 8 to 11.

From the explanations given with reference to FIGS. 12 to 14, it will be apparent that the principles of the invention are applicable without change in cases where the surface indicated as M in those figures is a solid reflective surface instead of being the surface of a liquid meniscus as assumed in the foregoing. The method of the invention can, therefore, be applied to the measurement of displacements of a solid body having a rounded (concave or convex) reflective surface portion forming part thereof or attached thereto.

Thus in FIG. 8 there is illustrated a solid body 45 displaceable over a supporting surface or structure 3 in the directions indicated by arrows f1f2. It is desired to indicate the position of body 45 with high accuracy even though the body cannot be directly engaged by a comparator feeler or the like, because, say, the body is highly deformable, or is of extremely low inertia so that its equilibrium would be disturbed by slight pressure, or is not directly accessible. While conventional interferometric devices are available whereby such measurement could be performed, the invention provides a means of measuring the displacements of the object with as high accuracy and in a considerably simpler manner. Attached to an upper surface of the part 45, through any convenient means such as suitable adhesive resin, is a small, light weight element 47 having a rounded reflective surface, conveniently a short section of cylindrical glass rod from 1 to 10 mm. in diameter, e.g. 4 mm. in diameter. The cylindrical rod is mounted with its axis of revolution preferably normal to the direction of object displacement and herein in a horizontal plane. An optical viewer 7 is mounted on supporting structure not shown for accurate displacement parallel to the direction f1f2 with its objective lens a short distance above the reflector rod 47 and with its optical axis vertical in this instance. A comparator device 11 is adjustably but stationarily supported from the fixed structure 3 with its feeler finger engaging a side of viewer 7. A light source 15a is positioned to illuminate the reflector rod 47 with rays such as 18 which, after reflection from the convex surface of the reflector, will produce reflected rays entering the viewer 7. As earlier explained, the light source 15a may be fixedly mounted on structure 3 in such position that the rays 18 are parallel to object displacement, or preferably the source may be rigidly connected with the viewer 7 by way of an undeformable frame as shown in dashed lines in FIG. 8. In the operation of the device, it is found that the viewer 7 can be so adjusted vertically as to bring into sharp focus a set of caustic-interference fringes, which fringes are produced by the process earlier disclosed herein specifically with reference to FIG. 13. Viewer 7 may then be adjusted horizontally so as to bring an initial one of the fringes into coincidence with a reticle wire or other marker of the viewer, whereupon any small displacement of object 45 will be indicated with extremely high accuracy by the amount of deflection of the comparator 11 pointer which occurs on readjustment of the horizontal position of viewer 7 required to recenter the selected interference fringe.

FIG. 9 illustrates a generally similar arrangement except that it includes as an additional feature a diaphragm plate 51 having a narrow slot 52 formed therein extending parallel to the axis of revolution of cylindrical reflector 47 and interposed between the light source 15a and the reflector. While the diaphragm plate 51 is here shown secured to the displaceable part 45, this is not essential and it may be connected for displacement with the viewer 7, and/or the light source 15a, or it may be fixedly mounted on the structure 3 if the incident light rays are parallel to object displacement as is here the case. It will be understood that where a narrow diaphragm is used, as in the modification of FIG. 9, the diaphragm slot or aperture 52, rather than the lamp 15a, acts as the effective light source in the system.

Where permitted by the nature of the part 45 the displacements of which are to be gauged, the reflector member such as 47 may be eliminated, and a suitable surface of the part itself used as the reflector surface of the invention. This will be true, inter alia, in cases where part 45 is a metallic part including a rounded corner such as 54 (FIG. 10) or indentation 55 (FIG. 11). The rounded surface portions such as 54 or 55 may, of course, form an inherent part of the body 45 being gauged, or may be especially provided thereon for the purposes of the invention. Preferably such reflective surface portions are provided with a specular finish as by suitable buffing. The curvature radius of convex surface 54 or concave surface 55 should lie within a range of from 0.5 to 5 mm., a range of about from 1 to 3 mm. being preferred for such radius.

In order successfully to carry out the invention, it is important that certain precautions be observed and certain more or less critical factors be adhered to, and these will now be discussed in greater detail. The discussion will refer more specifically to those embodiments wherein the invention is applied to the gauging of liquid levels since this embraces the more important aspects of the invention, but it is to be understood that many of the teachings to be given below also apply in connection with the gauging of displacements of solid objects.

*The light source.*—Any suitable light source of sufficiently small dimension in the direction normal to the desired interference fringes so as to generate light that is substantially coherent in that direction and thereby create well-defined fringes, may be used. The source may be an ordinary electric bulb having a fine elongated filament, say about one centimeter long and a diameter preferably less than 0.5 mm., though filament diameters up to 2 mm. or more may be used. Instead of or in addition to a linear light source of this type, there may be interposed between the source and the reflector surface a diaphragm plate having a narrow elongated slot therein as disclosed with reference to FIG. 9. The diaphragm slot may be about 0.5 or 1 mm. wide, and preferably has rounded side edges in order to reduce diffraction thereat which might interfere with the observation of the caustic-interference fringes used according to the invention.

While monochromatic illumination may be used if desired, it has been found in accordance with an important and unexpected advantage of the invention that such a precaution is usually superfluous, for the following reason. When observing the caustic-interference fringes of the invention under monochromatic illumination of different wavelengths, it is found that the position of the initial or primary dark fringe is substantially the same for all wavelengths, i.e. is achromatic. This is explained in FIG. 15 where light intensities are plotted as ordinates in arbitrary units versus distance in abscissae. The curves $C_1$ and $C_2$ show the light distributions for two different wavelengths of the light source used. The dark fringes are indicated by the valleys in the respective curves. It is seen that even though the two curves $C_1$ and $C_2$ are non-coincident throughout most of their extent, the main or initial dark fringes, at A, are substantially coincident. It is demonstrable that this property holds to within a high degree of approximation for all wavelengths. Hence ordinary, non-monochromatic lighting can be used in the method of the invention provided the initial dark fringe is employed as the marker.

The position of the source with respect to the meniscus or other reflective surface is important though not too critical. The source must be positioned so that there will be incident rays emanating from it that will strike the meniscus in a high-curvature (i.e. small-radius) region thereof, as shown for the incident rays $I_1$, $I_2$ in each of FIGS. 12 to 14. Otherwise the fringes would tend to form at too great a distance and the viewer would generally have to be provided with an excessively long focal length.

The source should further be so positioned that the angle of incidence of the rays, i.e. the angle formed by an incident ray such as $I_1$ or $I_2$ with the normal to the meniscus surface M at the point of incidence $P_1$ or $P_2$, will be relatively large. This is especially important where the liquid used is transparent, since in such case a light ray striking the interface under a small incidence angle will be mostly refracted rather than reflected as is desired. Excellent results are obtained where the incident rays used are nearly tangent to the meniscus surface, i.e. an incidence angle of almost 90°. In most practical cases the enumerated conditions as to curvature radius at the position of the point of incidence and the angle of incidence, can be readily satisfied when the source is so disposed with respect to the average liquid level in the vertical tube (assuming the over-all geometry shown in FIGS. 1, 7 and 12) that a straight line joining the source with the tube sidewall (W) at the free surface of the liquid is in a range from 0 to about 45° to the vertical, 30° being a preferred angle.

The source should not be positioned so close to the tube and liquid that the radiated heat might result in appreciable expansion effects. Clearly defined fringes can generally be observed using a source of moderate intensity positioned at about 40 cm. from the meniscus.

*The viewer.*—This may be any suitable microscope-type viewer having a total magnifying power of from about 20 to 200 times or more. Very high magnifications are not deemed desirable since they would involve excessive focal lengths for proper focussing of the caustic and interference fringes. A magnifying power in the range of from 30 to 40 times is convenient. High optical quality is not generally required of the viewer used in the invention, and for economical reasons the objective lens 8 may be simply constructed as a segment of glass rod if desired. The focal distance of the objective may conveniently be in a range of from 2 to 6 millimeters, and the objective is positioned at a corresponding short distance from the side of the tube. The eye-piece is preferably provided with a micrometer scale calibrated e.g. in hundredths of one millimeter, although a simple reticle wire or index may be used.

*The tube.*—The preferred embodiments of the invention, as illustrated in FIGS. 1 and 3–7, comprise liquid level gauging iinstruments (e.g. pressure gauges) utilizing tubes 2 having an inner diameter in a rather well-defined range. A lower limit for this range is set by the fact that very small-diameter tubes capillary forces intrude, causing the liquid to rise in the tube and perturb the measurements. This minimal diameter depends on the viscosity of the liquid used, but can generally be taken as about 3 or 4 millimeters. The upper limit of the range of tube diameters is determined by the following considerations. It will readily be understood that the sensitivity of the gauging method of the invention depends on the fineness of the interference fringes formed. It can be shown by analysis that the fineness of a fringe, for a given wavelength of light from the source, is inversely proportional to the cubic root of the radius of curvature of the caustic C (FIG. 12), which in turn is proportional to the radius of the tube, assuming a constant incidence angle of the light rays. Hence, increasing the tube radius reduces sensitivity to a small but perceptible extent (as a cubic root function of the tube radius). There is, however, another consideration which sets a more definite limit to the maximum tube diameter in many important circumstances of use.

In view of the high sensitivity of the gauging method of the invention, which is on the order of a few microns, the process is obviously sensitive to minute fluctuations in liquid level such as may be created by extraneous vibrations of the kind that are rarely absent from any industrial premises. It is found that such vibrations can be completely damped out by surface tension of the liquid, even in the case of low-viscosity liquids provided the inner diameter of the tube is small enough, generally less than about 20 mm.

With the above considerations in mind, a liquid-level gauging instrument, e.g. pressure gauge, according to the invention employs a tube with an inner diameter in the range from 4 to 20 mm., (depending on the nature of the liquid used), preferably 5 to 12 mm. It will thus be seen that in an instrument according to the invention the use of a relatively narrow tube achieves the twofold goal of providing a highly-curved menicus and caustic resulting in the formation of well-defined and easily observable interference fringes, while at the same time eliminating troublesome vibrations in an especially simple and effective manner. This contrasts with conventional interferometric gauging techniques using special means for producing interference fringes, and wherein the measurements have to be performed on relatively large liquid surfaces in large containers, accordingly requiring elaborate precautions to be taken for guarding against extraneous vibrations where precision is desired.

The wall thickness of the tube is not critical, but should preferably be highly uniform, e.g. about 1 mm. plus or minus 0.01 mm. throughout its useful length.

*The liquid.*— As shown earlier, the process of the invention is usable with all kinds of liquid, transparent and opaque, wetting and non-wetting, and in many cases the nature of the liquid would be dictated by considerations foreign to the present invention. The reason why practically all liquids are suitable is, partly, that any liquid surface possesses enough reflecting power for the purposes of the invention, even though said reflecting power varies considerably from one liquid to another. Thus, the approximate reflecting coefficients for a few common liquids are indicated as follows:

| | Percent |
|---|---|
| Alcohol | 5 |
| Silicone oil | 7 |
| Water | 10 |
| Mercury | 80 |

It is found that even in the case of a very poorly reflecting liquid such as alcohol, clearly observable caustic-interference fringes suitable for practicing the invention specified herein are obtained provided the teachings of the invention are obtained, and without requiring excessive illumination.

Since the invention, in its preferred aspects, utilizes the reflection of light from the surface of a liquid meniscus, it is important that the meniscus surface should be smooth and undistorted and free from the deformations which sometimes tend to mar the surface as when the liquid column stops rising and commences to drop, or vice versa. It is found in this respect that the results are sometimes substantially improved, especially in the case of mercury, if the inner surface of the tube is first lubricated with a very thin film of a suitable, highly pure, lubricant oil.

Another factor which is apt to interfere with the attainment of the highest possible accuracy in the gauging method of the invention, especially as applied to pressure gauges and the like, is that many liquids conventionally used in such instruments have a non-negligible vapour tension. Thus, mercury has a vapour tension of about $10^{-3}$ torr (mm. Hg). This is well below the degree of sensitivity of which most conventional pressure gauges are capable, so that mercury can be and is widely used in such conventional instruments without any special precautions. However, the value just noted is of the same order of magnitude as the sensitivity of the pressure gauges of the invention, so that a serious error might thus be introduced.

In an instrument constructed in accordance with the invention, when using a liquid having appreciable vapour at the temperature of use, such as mercury, the source of error just discussed is preferably eliminated through the following expedient. There is placed in the gauge tube, above the free surface of the mercury or other liquid indicated by 100, in FIG. 1 used, a short column of another liquid, not miscible with the main liquid and having a substantially lower vapour tension than it. Silicone oil as well as other liquids having the properties just enumerated can be used. This additional column may have a depth of say from 1 to 5 centimeters. The added pressure thus placed on the main liquid acts to prevent evaporation thereof, thus eliminating the above noted source of error. The additional pressure of the auxiliary liquid column can be easily taken into account by a suitable correction applied to the measurement.

What we claim is:
1. Liquid level gauging apparatus comprising:
   a tube positioned at an angle to the horizontal plane and containing said liquid, whereby a meniscus is formed at the junction of the free liquid surface and a wall of the tube;
   light projecting means supported for projecting light upon a high-curvature portion of said meniscus whereby the reflected light will envelop a caustic and form fringes adjacent the caustic;
   a magnifying optical viewer positioned adjacent said tube wall so as to be focusable on a selected one of said fringes; and
   precision displacement mounting means for said viewer whereby to displace the viewer in a direction parallel to said tube;
   including means so supporting said light projecting means that a light ray therefrom will be reflected into the viewer from the same point of said meniscus after said liquid level and said viewer have undergone similar displacements as prior to said displacements;
   whereby a selected one of said fringes will be observable under magnification through said viewer as a precise indication of liquid level displacement.
2. The apparatus defined in claim 1, wherein the liquid is transparent the meniscus is concave, and the light pro- jecting means is arranged to illuminate the underside of the meniscus through the liquid.

3. The apparatus defined in claim 1, wherein said meniscus is convex and the light projecting means is arranged to illuminate the upper side of the meniscus.

4. Apparatus according to claim 1 including a rigid frame interconnecting said light projecting means and said viewer for bodily displacement, said precision displacement means being connected with said frame to displace the viewer and light projecting means conjointly and bodily in a direction parallel to said tube.

References Cited

UNITED STATES PATENTS

| | | |
|---|---|---|
| 1,605,014 | 11/1926 | Thomas. |
| 1,959,537 | 5/1934 | Kühne. |
| 2,418,786 | 4/1947 | Nadig et al. |
| 2,937,234 | 5/1960 | Whitehead. |
| 2,948,186 | 8/1960 | Kendall _____ 73—401 X |
| 3,321,975 | 5/1967 | Parkes et al. _____ 73—401 |
| 2,369,798 | 2/1945 | Rasmussen _____ 73—293 |

OTHER REFERENCES

Elliott et al., An Optical Probe For Accurately Measusing Displacements of a Reflecting Surface, Jour. Sci. Inst., vol. 34, September 1957, pp. 349–352.

Terrien, J. Methodes Optiques Pour Mesurer la Hauteur de Mercure dun Manometre. Revue D'Optique. vol. 38, No. 1; January 1959, pp. 29–37.

RONALD L. WIBERT, Primary Examiner

T. MAJOR, Assistant Examiner

U.S. Cl. X.R.

73—293